(12) United States Patent
Wu

(10) Patent No.: US 10,326,396 B2
(45) Date of Patent: Jun. 18, 2019

(54) METHOD FOR ESTIMATING PARAMETERS OF A DC MACHINE BY THE LAPLACE TRANSFORM

(71) Applicant: I-SHOU UNIVERSITY, Kaohsiung (TW)

(72) Inventor: Rong-Ching Wu, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 0 days.

(21) Appl. No.: 15/871,229

(22) Filed: Jan. 15, 2018

(65) Prior Publication Data

US 2018/0226909 A1  Aug. 9, 2018

(30) Foreign Application Priority Data

Feb. 8, 2017  (TW) .............................. 106104157 A

(51) Int. Cl.
*G05B 19/18* (2006.01)
*H02K 11/02* (2016.01)
(Continued)

(52) U.S. Cl.
CPC .............. *H02P 21/14* (2013.01); *H02K 11/02* (2013.01); *H02P 23/14* (2013.01); *G05B 19/18* (2013.01); *H02P 11/04* (2013.01)

(58) Field of Classification Search
CPC ......... H02K 11/02; H02P 21/14; H02P 23/14; H02P 11/04; G05B 19/18
See application file for complete search history.

(56) References Cited

U.S. PATENT DOCUMENTS 5,388,052 A * 2/1995 Mann ........................ B66B 1/30
                                                   187/391
5,619,435 A * 4/1997 Prakash .............. G06F 17/5009
                                                   318/800
(Continued)

OTHER PUBLICATIONS

B. Dankovic, D. Antic, Z. Jovanovic, S. Nikolic and M. Milojkovic, "Systems modeling based on Legendre polynomials," 2009 5th International Symposium on Applied Computational Intelligence and Informatics, Timisoara, 2009, pp. 241-246. (Year: 2009).*

*Primary Examiner* — Eduardo Colon Santana
*Assistant Examiner* — Said Bouziane
(74) *Attorney, Agent, or Firm* — WPAT, PC

(57) ABSTRACT

A method for estimating parameters of a direct current machine by Laplace transform performed by a computer system. The method includes establishing a transient model of the DC machine and a transfer function based on the transient mode; transforming the transfer function from the time domain to the frequency domain by the Laplace transform to obtain each of an armature current and a rotational speed of the DC machine as a function of frequency; expressing the armature current and the rotational speed as polynomial fractions by polynomial regression, and comparing the functions of the frequency and the polynomial fractions to output values of the armature resistance, the armature inductance, the back electromotive force constant, the moment of inertia and the friction coefficient. As such, the accuracy and operational efficiency in estimating the parameters of the DC machine can be improved.

11 Claims, 5 Drawing Sheets

(51) Int. Cl.
*H02P 11/04* (2006.01)
*H02P 21/14* (2016.01)
*H02P 23/14* (2006.01)

(56) References Cited

U.S. PATENT DOCUMENTS

| | | | | |
|---|---|---|---|---|
| 5,814,962 A | * | 9/1998 | Mizumoto | G05B 19/19 318/400.11 |
| 5,998,957 A | * | 12/1999 | Tadmor | H02P 6/182 318/254.2 |
| 9,007,004 B2 | * | 4/2015 | Hunter | H02P 21/0003 318/400.15 |
| 2013/0221887 A1 | * | 8/2013 | Aghili | H02P 6/10 318/400.23 |
| 2018/0054139 A1 | * | 2/2018 | Huang | G01R 19/003 |

\* cited by examiner

METHOD FOR ESTIMATING PARAMETERS OF A DC MACHINE BY THE LAPLACE TRANSFORM

CROSS REFERENCE TO RELATED APPLICATIONS

The application claims the benefit of Taiwan application serial No. 106104157, filed on Feb. 8, 2017, and the entire contents of which are incorporated herein by reference.

BACKGROUND OF THE INVENTION

1. Field of the Invention

The present invention generally relates to a method for estimating parameters of a direct current (DC) machine, more particularly, to a method for estimating the parameters of the DC machine by the Laplace transform.

2. Description of the Related Art

The function of the DC machines is to perform conversion between the mechanical energy and the DC electric power under the magnetic field. DC machines have been widely used in automation industry, precision machining industry and other related fields due to the advantages such as easy acquisition of the power (DC power), high starting torque, high acceleration and deceleration torques, as well as the ability to control the rotational speed by merely adjusting the magnitude of the voltage.

For example, in a precision motion system, since the parameters of the motion system have a great influence on the control performance of the motion system itself, it is necessary to ensure that the parameters of the motion system can be accurately identified so as to effectively design the motion system to improve the performance of the motion system. In order to design a DC machine that can accurately identify the parameters of the motion system, the design analysis and research are carried out mostly based on the equivalent model of the DC machine.

Specifically, the models that are often used in the analysis of the DC machine can be divided into two categories, which are transient model and steady-state model. In the transient model, since a DC machine is modeled as a second-order circuit characterized by a second-order differential equation, a zero-input response and a zero-state response are generated when applying a step function input. However, due to the fact that the zero-input response is in the form of an exponential function, the parameters of the DC machine cannot be decomposed and analyzed easily in an operation, leading to poor operational efficiency. Furthermore, the signals of the terminal voltage, the armature current and the rotational speed of the DC machine may be disturbed by the noise due to the commutation of the DC machine. Also, the actual structure of the DC machine is much more complex than the transient model, which in turn causes errors between the estimated parameter values of the transient model and the actual parameter values of the DC machine.

In light of this, it is necessary to improve the operational efficiency, to avoid the noise interference, as well as to reduce the error to meet the actual need of the parameter estimation and to enhance its utility.

SUMMARY OF THE INVENTION

It is therefore an objective of this invention to provide a method for estimating the parameters of a DC machine by the Laplace transform, in which the method is capable of simplifying the operational procedure, eliminating the noise interference, and reducing the errors between the estimated parameter values and the actual parameter values of the DC machine.

In an aspect of the invention, a method for estimating the parameters of the direct current machine by Laplace transform as executed by a computer system dedicated to estimating the parameters of the direct current machine is disclosed. The computer system includes a calculation module, a human machine interface, a data retrieval module, a servo driver, a servo motor and the DC machine. The method includes establishing a transient model of the direct current machine by the calculation module. The transient model includes an equivalent circuit and an equivalent mechanism. The equivalent circuit includes an armature resistance, an armature inductance and a back electromotive force constant. The equivalent mechanism includes a moment of inertia and a friction coefficient. The method further includes sampling a terminal voltage, an armature current and a rotational speed of the direct current machine at a plurality of time points by the computer system, quantizing each of the terminal voltage, the armature current and the rotational speed into a discrete value at each of the plurality of time points when the direct current machine is started, generating an estimated value of each of the terminal voltage, the armature current and the rotational speed based on the discrete values of the terminal voltage, the armature current and the rotational speed, and establishing a transfer function based on the transient mode by the calculation module. The transfer function generates a first frequency domain function of the estimated value of the armature current and a second frequency domain function of the estimated value of the rotational speed according to the Laplace transform. The method further includes expressing the first and second frequency domain functions to respectively generate third and fourth frequency domain functions, making the first and third frequency domain functions equal to each other and the second and fourth frequency domain functions equal to each other to generate relational equations of the armature resistance, the armature inductance, the back electromotive force constant, the moment of inertia, and the friction coefficient, obtaining relational equations of the armature resistance, the armature inductance, the back electromotive force constant, the moment of inertia and the friction coefficient by setting the first and third frequency domain functions equal to each other and the second and fourth frequency domain functions equal to each other, as performed by the calculation module, expressing a difference between an actual value of the armature current and the estimated value of the armature current by a first error function to generate coefficients of a polynomial fraction of the third frequency domain function, and a difference between an actual value of the armature current and the estimated value of the armature current by a second error function to generate coefficients of a polynomial fraction of the fourth frequency domain function, generating coefficients of a polynomial fraction of the estimated value of the rotational speed according to a plurality of frequency domain values of the rotational speed and the first error function, adjusting the relational equations according to the coefficients of the polynomial fractions of the third and fourth frequency domain functions, and outputting the estimated values of the armature resistance and the armature inductance, the back electromotive force constant, a value of the moment of inertia and a value of the friction coefficient to the data retrieval module.

In an example, the transfer function is expressed as:

$$\begin{bmatrix} R_a + L_a P & K \\ K & -(B+JP) \end{bmatrix} \begin{bmatrix} \hat{i} \\ \hat{\omega} \end{bmatrix} = \begin{bmatrix} \hat{v} \\ 0 \end{bmatrix}.$$

$\hat{v}$, $\hat{i}$ and $\hat{\omega}$ are the terminal voltage, the armature current and the rotational speed, respectively. $R_a$, $L_a$, J and B are the armature resistance, the armature inductance, the moment of inertia and the friction coefficient, respectively. P is a notation for differentiation. K is the back electromotive force constant or a torque constant.

In an example, the first frequency domain function is expressed as:

$$\hat{I}(s) = \frac{\hat{v}\left(\frac{1}{L_a} + \frac{B}{L_a J}\right)}{s\left(s^2 + s\left(\frac{B}{J} + \frac{R_a}{L_a}\right) + \frac{R_a B + K^2}{L_a J}\right)}.$$

$\hat{I}(s)$ is the estimated value of the armature current, $\hat{v}$ is the estimated value of the terminal voltage, and s is a complex frequency.

In an example, the third frequency domain function is expressed as:

$$\hat{I}(s) = \frac{c_1 s + c_0}{s^3 + b_2 s^2 + b_1 s}.$$

$\hat{I}(s)$ is the estimated value of the armature current after noise is filtered. $b_1$, $b_2$, $c_0$ and $c_1$ are the coefficients of the polynomial fraction of the third frequency domain function. S is a complex frequency.

In an example, the polynomial fraction of the armature current is expressed as:

$$E'_I = \sum_{s=s_1}^{s_2} ((s^3 + b_2 s^2 + b_1 s)I(s) - (c_1 s + c_0))^2.$$

$E_I'$ is the difference between the actual value of the armature current and the estimated value of the armature current. $s_1$ is a lower limit of the complex frequency, and $s_2$ is an upper limit of the complex frequency.

In an example, a partial derivative of each of the coefficients of the polynomial fraction of the first error function is made zero to obtain the coefficients as:

$$\begin{bmatrix} b_2 \\ b_1 \\ c_1 \\ c_0 \end{bmatrix} = \begin{bmatrix} \sum_{s=s_1}^{s_2} s^4 I^2 & \sum_{s=s_1}^{s_2} s^3 I^2 & -\sum_{s=s_1}^{s_2} s^2 I & -\sum_{s=s_1}^{s_2} s^2 I \\ \sum_{s=s_1}^{s_2} s^3 I^2 & \sum_{s=s_1}^{s_2} s^2 I^2 & -\sum_{s=s_1}^{s_2} s^2 I & -\sum_{s=s_1}^{s_2} sI \\ \sum_{s=s_1}^{s_2} s^3 I & \sum_{s=s_1}^{s_2} s^2 I & -\sum_{s=s_1}^{s_2} s^2 & -\sum_{s=s_1}^{s_2} s \\ \sum_{s=s_1}^{s_2} s^2 I & \sum_{s=s_1}^{s_2} sI & -\sum_{s=s_1}^{s_2} s & -\sum_{s=s_1}^{s_2} 1 \end{bmatrix}^{-1} \begin{bmatrix} -\sum_{s=s_1}^{s_2} s^5 I^2 \\ -\sum_{s=s_1}^{s_2} s^4 I^2 \\ -\sum_{s=s_1}^{s_2} s^4 I \\ -\sum_{s=s_1}^{s_2} s^3 I \end{bmatrix}.$$

In an example, the second error function is expressed as:

$$\hat{W}(s) = \frac{\frac{\hat{v}K}{L_a J}}{s\left(s^2 + s\left(\frac{B}{J} + \frac{R_a}{L_a}\right) + \frac{R_a B + K^2}{L_a J}\right)}.$$

$\hat{W}(s)$ is the estimated value of the rotational speed, $\hat{v}$ is the estimated value of the terminal voltage, and s is a complex frequency.

In an example, the fourth frequency domain function is expressed as:

$$\hat{W}(s) = \frac{d_0}{s^3 + b_2 s^2 + b_1 s}.$$

$\hat{W}(s)$ is the estimated value of the rotational speed after noise is filtered, and $b_1$, $b_2$ and $d_0$ are the coefficients of the polynomial fraction of the fourth frequency domain function.

In an example, the second error function is expressed as:

$$E'_w = \sum_{s=s_1}^{s_2} ((s^3 + b_2 s^2 + b_1 s)W(s) - d_0)^2.$$

$E_w'$ is the difference between the actual value of the rotational speed and the estimated value of the rotational speed. $s_1$ is a lower limit of the complex frequency, and $s_2$ is an upper limit of the complex frequency.

In an example, a partial derivative of each of the coefficients of the polynomial fraction of the second error function is made zero to obtain the coefficients as:

$$d_0 = \frac{1}{s_2 - s_1 + 1}\left(\sum_{s=s_1}^{s_2} W(s)(s^3 + b_2 s^2 + b_1)\right).$$

In another aspect, an apparatus for estimating the parameters of the direct current machine by Laplace transform comprises a computer system dedicated to performing the above method for estimating the parameters of the direct current machine by the Laplace transform.

In summary, through expressing the discrete values of the terminal voltage, the armature current and the rotational speed by polynomial regression, the method for estimating parameters of the DC machine by the Laplace transform according to an embodiment of the invention is able to maintain the transient characteristics of the DC machine during the filtering process of the noise. Moreover, the method according to the embodiment of the invention may transform the parameters of the DC machine from the time domain to the frequency domain, effectively reducing the operational complexity. Advantageously, the accuracy and operational efficiency in estimating the parameters of the DC machine can be improved.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
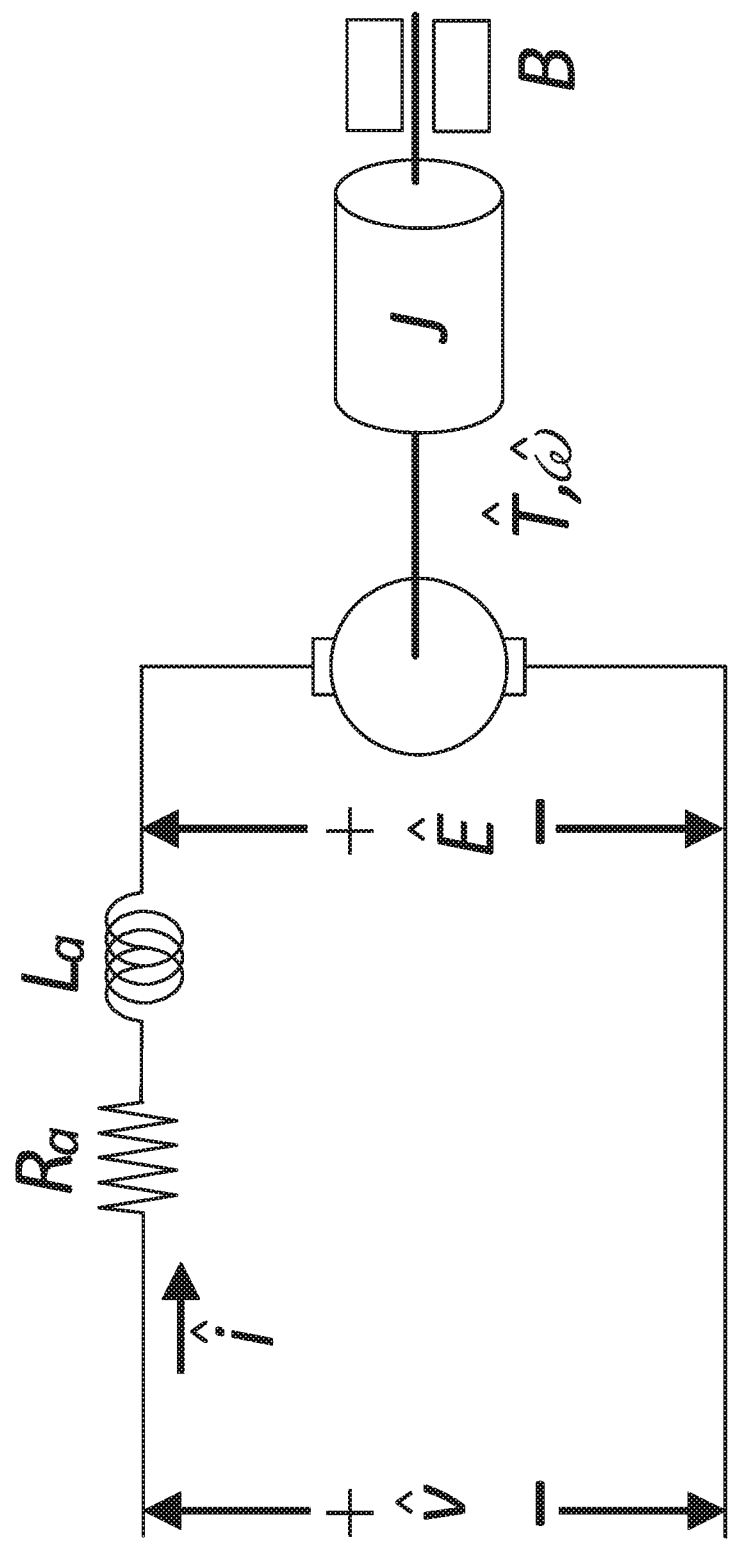
FIG. 1 is a circuit diagram illustrating a transient model used by a method for estimating parameters of a DC machine by the Laplace transform according to an embodiment of the invention.

FIG. 1 shows a transient model of a direct current (DC) machine on which a parameter estimating method is performed under Laplace transform to obtain the parameter values of the DC machine. During the practical measurement, since an actual terminal voltage, an actual armature current and an actual rotational speed are not fixed due to noise or other factors, the estimated values of the terminal voltage, the armature current and the rotational speed in the transient model represent the actual values of the terminal voltage, the armature current and the rotational speed. The transient model includes an equivalent circuit and an equivalent mechanism. The equivalent circuit includes an armature resistance Ra, an armature inductance La and a back electromotive force constant $\hat{E}$ of a DC machine. The equivalent mechanism includes a moment of inertia J and a friction coefficient B of the DC machine.

Based on the above transient model, the relations of the equivalent circuit can be established. An estimated value of the terminal voltage of the DC machine can be expressed as the following equation (1):

$$\hat{v} = R_a \hat{i} + L_a \frac{d\hat{i}}{dt} + \hat{E}. \tag{1}$$

$\hat{v}$ is the estimated value of the terminal voltage of the DC machine, $\hat{i}$ is an estimated value of the armature current of the DC machine, $R_a$ is the armature resistance, $L_a$ is the armature inductance, $\hat{E}$ is an estimated value of a back electromotive force, and $d\hat{i}/dt$ is the rate of change of the estimated value of the armature current.

In addition, the relation between the estimated value of the back electromotive force ($\hat{E}$) and an estimated value of the rotational speed of the DC machine can be expressed as the following equation (2):

$$\hat{E} = K_E \hat{\omega}, \tag{2}$$

$\hat{E}$ is the estimated value of the back electromotive force, $K_E$ is the back electromotive force constant, and $\hat{\omega}$ is the estimated value of the rotational speed.

Therefore, the above equation (1) may be rewritten as the following equation (3):

$$\hat{v} = R_a \hat{i} + L_a \frac{d\hat{i}}{dt} + K_E \hat{\omega}. \tag{3}$$

$\hat{v}$, $\hat{i}$ and $\hat{\omega}$ are the estimated values of the terminal voltage, the armature current and the rotational speed, respectively. $R_a$, $L_a$ and $K_E$ are the armature resistance, the armature inductance and the back electromotive force constant, respectively. $d\hat{i}/dt$ is the rate of change of the estimated value of the armature current.

Moreover, when the DC machine has no load, the relations of the equivalent mechanism can be described by the following equations (4) and (5):

$$\hat{T} = J\frac{d\hat{\omega}}{dt} + B\hat{\omega}, \tag{4}$$

$$\hat{T} = K_T \hat{i}. \tag{5}$$

T is an estimated value of a torque, J is the moment of inertia, B is the friction coefficient, $K_T$ is a torque constant. $\hat{i}$ and $\hat{\omega}$ are the estimated values of the armature current and the rotational speed, respectively. $d\hat{\omega}/dt$ is the rate of change of the estimated value of the rotational speed.

Besides, since the back electromotive force constant $K_E$ is equal to the torque constant $K_T$, each of the back electromotive force constant $K_E$ (in equation (3)) and the torque constant $K_T$ (in equation (5)) can be replaced by a parameter K in this embodiment. As a result, based on the relations of the equivalent circuit and the equivalent mechanism of the transient model, a transfer function of the DC machine can be established as:

$$\begin{bmatrix} R_a + L_a P & K \\ K & -(B + JP) \end{bmatrix} \begin{bmatrix} \hat{i} \\ \hat{\omega} \end{bmatrix} = \begin{bmatrix} \hat{v} \\ 0 \end{bmatrix}. \tag{6}$$

$\hat{v}$, $\hat{i}$ and $\hat{\omega}$ are the estimated values of the terminal voltage, the armature current and the rotational speed, respectively. $R_a$, $L_a$, J and B are the armature resistance, the armature inductance, the moment of inertia and the friction coefficient, respectively. P is a differential divisor, and K is the back electromotive force constant or the torque constant.

Since the DC machine is modeled as a second-order circuit characterized by a second-order differential equation, a zero-input response and a zero-state response are generated when applying a step function input. However, since the zero-input response is an exponential function which is not easy to decompose and analyze during the operation, the operational efficiency is low. Therefore, the exponential function can be transformed to into a polynomial by Laplace Transform in this embodiment to effectively reduce the operational complexity, improving the operational efficiency.

Specifically, when an input voltage is a step function with a value $\hat{V}$, the Laplace transform of the input voltage can be represented as $\hat{V}/S$, wherein S is a complex frequency. Thus, the above equation (6) can be transformed from the time domain to the frequency domain by the Laplace transform as shown in the following equation (7):

$$\begin{bmatrix} R_a + sL_a & K \\ K & -(B+sJ) \end{bmatrix} \begin{bmatrix} \hat{I} \\ \hat{W} \end{bmatrix} = \begin{bmatrix} \frac{\hat{v}}{s} \\ 0 \end{bmatrix}. \quad (7)$$

$\hat{V}$, $\hat{I}$ and $\hat{W}$ are the estimated values of the terminal voltage, the armature current and the rotational speed in the frequency domain, respectively. $R_a$, $L_a$, J and B are the armature resistance, the armature inductance, the moment of inertia and the friction coefficient, respectively. S is the complex frequency and K is the back electromotive force constant or the torque constant.

Thus, a first frequency domain function of the estimated value of the armature current can be obtained based on equations 7a-7h below, and a second frequency domain function of the estimated value of the rotational speed can be obtained based on equations 7i-7k below:

$$\begin{bmatrix} \hat{I} \\ \hat{W} \end{bmatrix} = \begin{bmatrix} R_a + sL_a & K \\ K & -(B+sJ) \end{bmatrix}^{-1} \begin{bmatrix} \frac{\hat{v}}{s} \\ 0 \end{bmatrix}, \quad (7a)$$

$$\begin{bmatrix} \hat{I} \\ \hat{W} \end{bmatrix} = \frac{1}{(R_a+sL_a)(-B-sJ)-K^2} \begin{bmatrix} -(B+sJ) & -K \\ -K & R_a+sL_a \end{bmatrix} \begin{bmatrix} \frac{\hat{v}}{s} \\ 0 \end{bmatrix}, \quad (7b)$$

$$\begin{bmatrix} \hat{I} \\ \hat{W} \end{bmatrix} = \frac{1}{(R_a+sL_a)(-B-sJ)-K^2} \begin{bmatrix} -(B+sJ)\frac{\hat{v}}{s} \\ -K\frac{v}{s} \end{bmatrix}, \quad (7c)$$

$$\hat{I}(s) = \frac{\hat{v}}{s} \frac{-(B+sJ)}{(R_a+sL_a)(-B-sJ)-K^2}, \quad (7d)$$

$$\hat{I}(s) = \frac{\hat{v}}{s} \frac{B+sJ}{(R_a+sL_a)(B+sJ)+K^2}, \quad (7e)$$

$$\hat{I}(s) = \frac{\hat{v}}{s} \frac{B+sJ}{R_aB+sR_aJ+sL_aB+s^2L_aJ+K^2}, \quad (7f)$$

$$\hat{I}(s) = \frac{\hat{v}}{s} \frac{s\frac{J}{L_aJ}+\frac{B}{L_aJ}}{s^2+s\left(\frac{R_aJ+L_aB}{L_aJ}\right)+\frac{R_aB+K^2}{L_aJ}}, \quad (7g)$$

$$\hat{I}(s) = \frac{\hat{v}}{s} \frac{s\frac{J}{L_a}+\frac{B}{L_aJ}}{s^2+s\left(\frac{R_a}{L_a}+\frac{B}{J}\right)+\frac{R_aB+K^2}{L_aJ}}, \quad (7h)$$

$$\hat{W}(s) = \frac{\hat{v}}{s} \frac{K}{s(R_a+sL_a)(B+sJ)+K^2}, \quad (7i)$$

$$\hat{W}(s) = \frac{\hat{v}}{s} \frac{K}{R_aB+sR_aJ+sL_aB+s^2L_aJ+K^2}, \quad (7j)$$

$$\hat{W}(s) = \frac{\hat{v}}{s} \frac{\frac{K}{L_aJ}}{s^2+s\left(\frac{R_aJ+L_aB}{L_aJ}\right)+\frac{R_aB+K^2}{L_aJ}}, \quad (7k)$$

$$\hat{I}(s) = \frac{\hat{v}\left(\frac{1}{L_a}+\frac{B}{L_aJ}\right)}{s\left(s^2+s\left(\frac{B}{J}+\frac{R_a}{L_a}\right)+\frac{R_aB+K^2}{L_aJ}\right)}, \quad (8)$$

$$\hat{W}(s) = \frac{\frac{\hat{v}K}{L_aJ}}{s\left(s^2+s\left(\frac{B}{J}+\frac{R_a}{L_a}\right)+\frac{R_aB+K^2}{L_aJ}\right)}. \quad (9)$$

$\hat{I}(s)$ and $\hat{W}(s)$ are the frequency domain functions of the estimated values of the armature current and the rotational speed. $\hat{v}$ is the estimated value of the terminal voltage. $R_a$, $L_a$, J and B are the armature resistance, the armature inductance, the moment of inertia and the friction coefficient, respectively. S is the complex frequency and K is the back electromotive force constant or the torque constant.

Figure 2A:
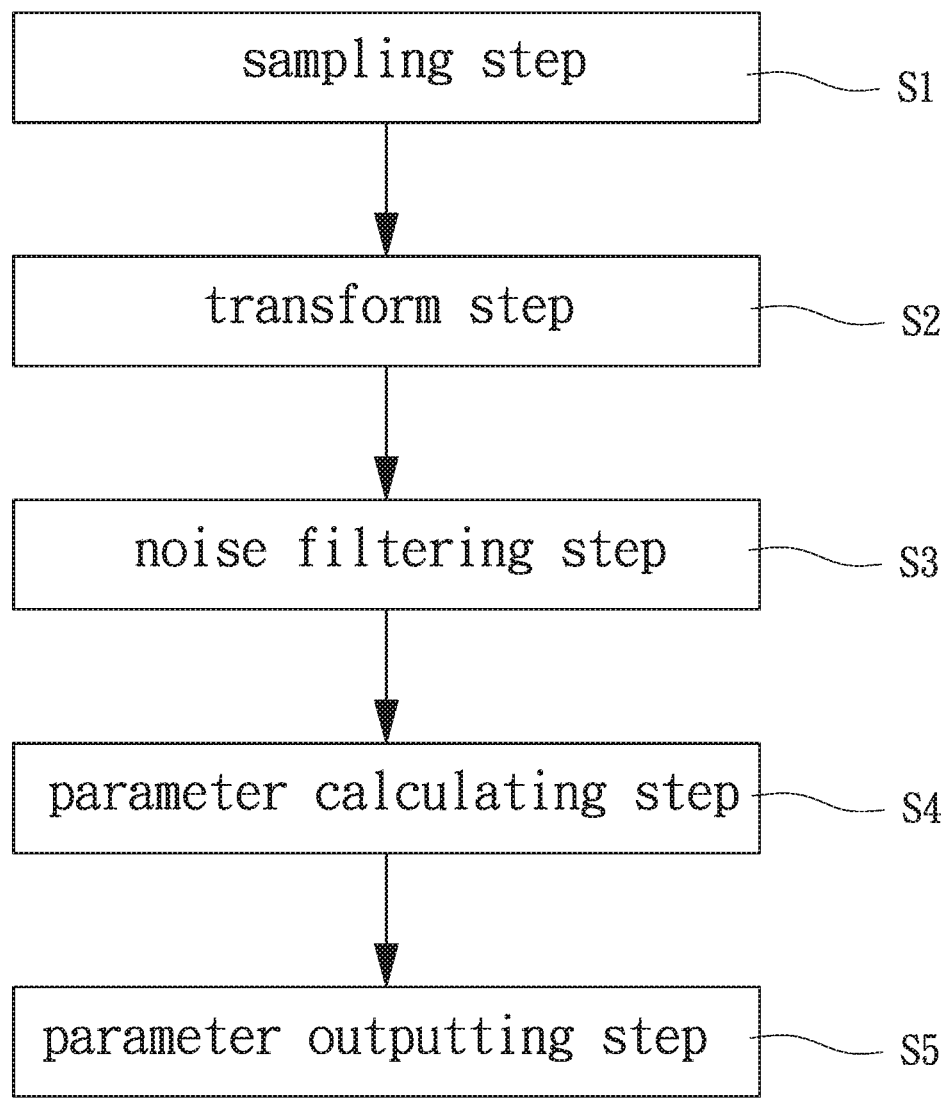
FIG. 2a shows a block diagram illustrating a method for estimating the parameters of the DC machine by the Laplace transform according to an embodiment of the invention.

With reference to FIG. 2a, which is a block diagram illustrating a method for estimating the parameters of a DC machine by the Laplace transform according to the embodiment of the invention. The method may be performed by a computer system (e.g., an industrial personal computer, IPC) for executing a parameter estimation program and outputting an DC machine parameter, such as an armature resistance, an armature inductance, a back electromotive force (back EMF) coefficient, a moment of inertia or a viscous friction coefficient.

Figure 2B:
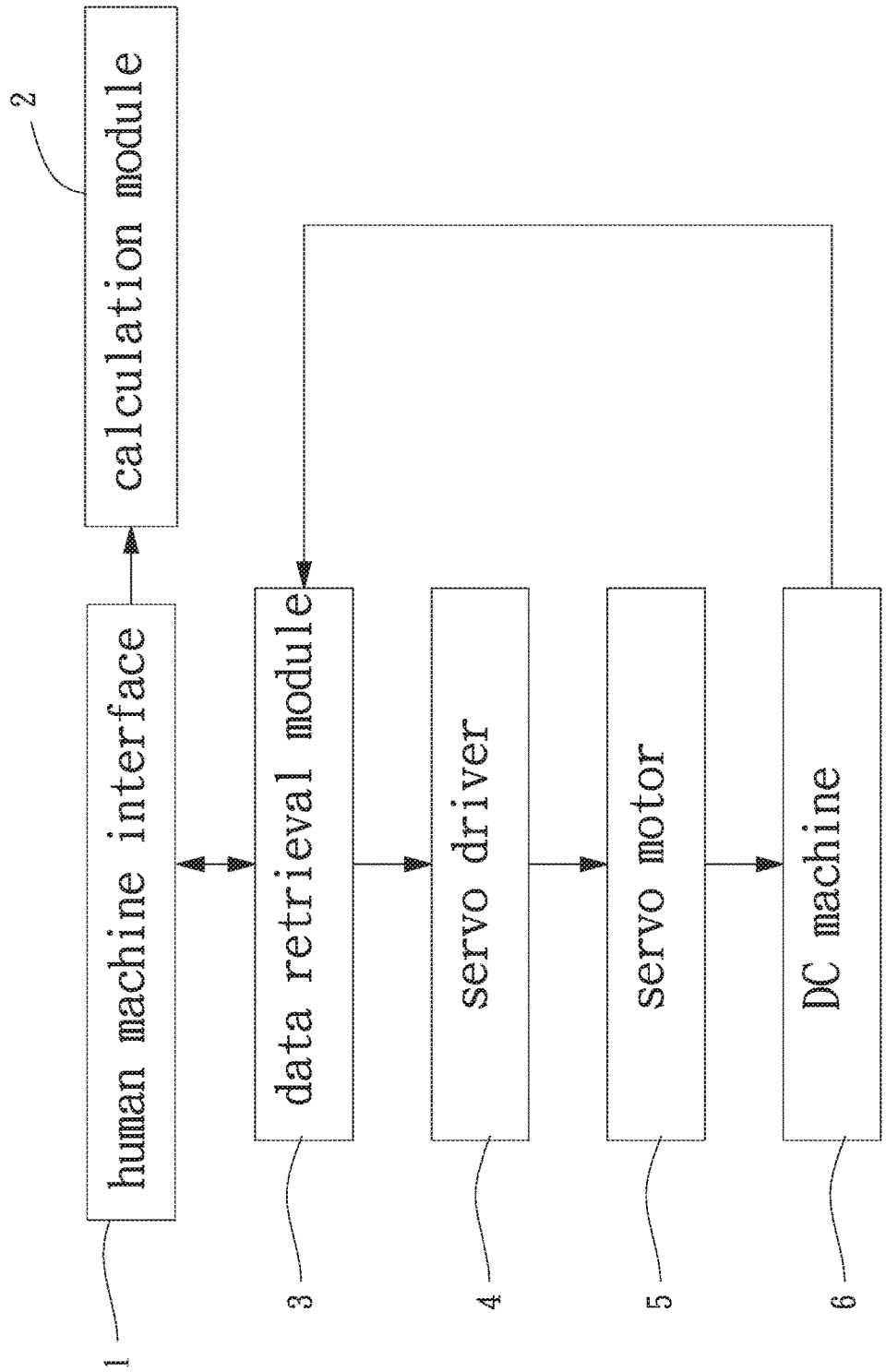
FIG. 2b shows a block diagram of a computer system dedicated to performing the method for estimating the parameters of the DC machine by the Laplace transform according to the embodiment of the invention.

In this embodiment, referring to FIG. 2b, the hardware architecture of the computer system may include a calculation module 1, a human machine interface 2, a data retrieval module 3, a servo driver 4, a servo motor 5 and a DC machine 6. The calculation module 1 is used to calculate the parameter values of the DC machine. The human machine interface 2 is electrically connected to the calculation module 1 and is used to set, read and display the operating status of the DC machine 6. The data retrieval module 3 is electrically connected to the calculation module 1 and is capable of outputting a command regarding the rotational speed to the servo driver 4 to drive the servo motor 5. The servo motor 5 is able to drive the DC machine 6 to generate electricity. The data retrieval module 3 may include a signal capture card and a plurality of sensors, but is not limited thereto.

The method for estimating the parameters of the DC machine by the Laplace transform according to the embodiment of the invention may include, but is not limited to, a sampling step S1, a transforming step s2, a noise filtering step S3, a parameter calculating step S4 and a parameter outputting step S5.

In the sampling step S1, after the DC machine is started, the data retrieval module 3 of the computer system samples the terminal voltage, the armature current and the rotational speed of the DC machine at different time points. The terminal voltage, the armature current and the rotational speed are respectively quantized into a set of discrete values based on the sampling time. The calculation module 1 of the computer system obtains an estimated value of the terminal voltage from the set of discrete values of the terminal voltage, an estimated value of the armature current from the set of discrete values of the armature current, and an estimated value of the rotational speed from the set of discrete values of the rotational speed. The principle in obtaining the estimated values from the sets of discrete values can be readily appreciated by the skilled person and therefore is not described herein.

The transforming step S2 is configured to respectively transform the estimated values of the terminal voltage, the armature current and the rotational speed from time domain to frequency domain. Namely, the estimated value of each of the terminal voltage, the armature current and the rotational speed is transformed from an exponential function into a polynomial to reduce the operational complexity in the time domain.

In the transforming step S2 of this embodiment, the computer system is able to transform the estimated value of each of the armature current and the rotational speed into a polynomial by the Laplace transform. For example, if a time domain signal is composed of a single exponential component, the exponential component can be expressed as the following equation (10):

$$x(n) = \alpha e^{-\lambda n/N}, n = 0, 1, \ldots N-1, \quad (10)$$

$x(n)$ is the time domain value of the exponential component, n is the sampling sequence of the exponential component (e.g., n=1, 2, ..., N−1), a is a coefficient of the exponential component, $e^{-\lambda n/N}$ is an exponential term of the exponential component, and $1/\lambda$ is a time constant.

Moreover, equation (10) can be transformed into a polynomial in the frequency domain by the Laplace transform as follows:

$$X(s) = \frac{1}{N} \sum_{n=0}^{N-1} x(n) e^{-sn/N}, s = 0, 1, \ldots, N-1. \quad (11)$$

$X(s)$ is the frequency domain value of the exponential component, $x(n)$ is the time domain value of the exponential component, n is the sampling sequence of the exponential component (e.g., n=1, 2, ..., N−1), $e^{-sn/N}$ is an exponential term, and S/N is a frequency resolution.

According to the above equations (10) and (11), $X(s)$ can be further expressed as:

$$X(s) = \frac{\alpha}{N} \frac{1 - e^{-(\lambda+s)}}{1 - e^{-(\lambda+s)/N}}, s = 0, 1, \ldots, N-1. \quad (12)$$

In the above equation (12), the result of the numerator of the equation (12) is approximately 1 when $\lambda+s>5$. The numerator can be derived from the following equation (13):

$$1 - e^{-(\lambda+s)}|_{\lambda+s>5} \cong 1, \quad (13)$$

In addition, the result of the denominator of the equation (12) is approximately $(\alpha+s)$ when $N \gg \alpha+S$. The denominator can be derived from the following equation (14):

$$1 - e^{-(\lambda+s)}|_{\lambda+s>5} \cong \lambda+s/N, \quad (14)$$

Therefore, according to the above equations (12) and (13), the result of the equation (12) is approximately as:

$$X(s) = \frac{\alpha}{\lambda + s}, s = s_1, \ldots, s_2. \quad (15)$$

$X(s)$ is the frequency domain value of the exponential component, $\alpha$ is the coefficient of the exponential component, $1/\alpha$ is the time constant, S is a lower limit of the complex frequency and $S_2$ is an upper limit of the complex frequency.

However, in the above equation (15), the lower limit $S_1$ must satisfy the condition of the above equation (13) (i.e. $\lambda+s_1>5$) and the upper limit $S_2$ must satisfy the condition of the above equation (14) (i.e. $N \gg \lambda+s_2$), such that the complex frequency in the interval $[S_1, S_2]$ can be substituted into the above equation (15). Namely, for the complex frequency in the interval $[S_1, S_2]$, the estimated values of the armature current and the rotational speed can be respectively transformed into a polynomial by the Laplace transform.

On the other hand, if the time domain signal consists of a plurality of exponential components, the plurality of exponential components can be expressed as the following equation (16):

$$x'(n) = \sum_{m=0}^{M} \alpha_m e^{-\lambda_m n/N}, n = 0, 1, \ldots N-1. \quad (16)$$

$x'(n)$ is the time domain value of the sum of the plurality of exponential components, n is the sampling sequence of the plurality of exponential components (e.g., n=1, 2, ..., N−1), $\alpha_m$ is the coefficient of the $m^{th}$ exponential component, $e^{-\lambda_m n/N}$ is an exponential term of the $m^{th}$ exponential component, $1/\lambda$ is a time constant for the $m^{th}$ exponential component and M is the number of the plurality of exponential components.

Moreover, the Laplace transform of the sum of the plurality of exponential components in the above equation (16) is shown in the following equation (17):

$$X'(s) = \sum_{m=0}^{M} \frac{\alpha_m}{\lambda_m + s}, s = s_1, \ldots, s_2. \quad (17)$$

$X(s)$ is the frequency domain value of the sum of the plurality of exponential components, $\alpha_m$ is the coefficient of the $m^{th}$ exponential component, $1/\lambda_m$ is the time constant for the $m^{th}$ exponential component, $S_1$ is the lower limit of the complex frequency and $S_2$ is the upper limit of the complex frequency.

Since the step response of the DC machine can be expressed as the following equation (18):

$$x''(n) = \alpha_0 + \alpha_1 e^{-1n/N} + \alpha_2 e^{-\lambda 2n/N}, n=0,1, \ldots N-1, \quad (18)$$

$x''(n)$ is the time domain value of the sum of the plurality of exponential components, $\alpha_n$ is the coefficient of the $n^{th}$ exponential component, n is the sampling sequence of the plurality of exponential components (e.g., n=1, 2), and $e^{-1n/N}$ is an exponential term of the $m^{th}$ exponential component.

Therefore, once the Laplace transform is applied, the step response of the DC machine can be expressed as the following equation (19):

$$X''(s) = \frac{\alpha_0}{s} + \frac{\alpha_1}{s+\lambda_1} + \frac{\alpha_2}{s+\lambda_2}. \quad (19)$$

$X''(s)$ is the frequency domain value of the sum of the plurality of exponential components, a, is the coefficient of the $n^{th}$ exponential component, S is the complex frequency, and $1/\lambda_n$ is the time constant for the $n^{th}$ exponential component (e.g., n=1, 2).

Furthermore, the above equation (19) may be rewritten as a polynomial fraction as shown in the following equation (20) or (21):

$$X''(s) = \frac{c_1 s + c_0}{s^3 + b_2 s^2 + b_1 s}, \text{ or} \quad (20)$$

-continued $$X''(s) = \frac{d_0}{s^3 + b_2 s^2 + b_1 s}. \quad (21)$$

X"(s) is the frequency domain value of the sum of the plurality of exponential components, $b_1$, $b_2$, $c_0$, $c_1$ and $d_0$ are coefficients of the polynomial fractions, and S is the complex frequency.

Since the actual values of the terminal voltage, the armature current and the rotational speed may contain noise due to the commutation of the DC machine, the estimated parameter values of the DC machine as calculated may have a large difference from the actual parameter values of the DC machine. Thus, in this embodiment, the noise filtering step S3 is able to filter the noise from the estimated values of the terminal voltage, the armature current and the rotational speed by polynomial regression. Besides, the noise filtering step S3 is able to maintain the transient characteristics of the DC machine during the filtering process of the noise, so that the estimated values of the DC machine parameter as calculated can be consistent with the actual behavior of the DC machine.

In summary, after the noise is filtered from the above equations (8) using polynomial regression, a third frequency domain function of the estimated value of the filtered armature current can be rewritten as the following equation (22):

$$\hat{I}(s) = \frac{c_1 s + c_0}{s^3 + b_2 s^2 + b_1 s}. \quad (22)$$

$\hat{I}(s)$ is a frequency domain function of the estimated value of the armature current in the frequency domain after the filtering of the noise. $b_1$, $b_2$, $c_0$ and $c_1$ are coefficients of the polynomial fraction, and S is the complex frequency.

In order to make the estimated values of the parameters of the DC machine close to the actual values, in this embodiment, the parameter calculating step S4 can minimize the differences between the estimated values and the actual values of the parameters of the DC machine by the following equation (23), allowing the estimated values of the parameters of the DC machine to approach the actual values.

For example, assuming that the actual values of the armature current in the frequency domain is I, then an error function between the actual value and the estimated value of the armature current is expressed as the following equation (23):

$$E_I = \sum_{s=s_1}^{s_2} (I(s) - \hat{I}(s))^2. \quad (23)$$

$E_1$ is the difference between the actual value and the estimated value of the armature current in the frequency domain, S is the complex frequency, $S_1$ is the lower limit of the complex frequency, $S_2$ is the upper limit of the complex frequency, I(s) is the function of the actual value of the armature current in the frequency domain, and $\hat{I}(s)$ is the function of the estimated value of the armature current in the frequency domain after the noise is filtered.

Based on the above equation (22), when the actual value of the armature current is equal to the estimated value of the armature current (the difference between the actual value and the estimated value is 0), since both $$\left( \frac{(s^3 + b_2 s^2 + b_1 s)I(s) - c_1 s - c_0}{s^3 + b_2 s^2 + b_1 s} \right)^2$$

and $((s^3+b_2 s^2+b_1 s)I(s)-(c_1 s+c))^2$ are zero and have the same solution, the equation (23) can be rewritten as follow:

$$E_I' = \sum_{s=s_1}^{s_2} ((s^3 + b_2 s^2 + b_1 s)I(s) - (c_1 s + c_0))^2. \quad (24)$$

$E_1$ is the difference between the actual value and the estimated value of the armature current, S is the complex frequency, $S_1$ is the lower limit of the complex frequency, $S_2$ is the upper limit of the complex frequency, I(s) is the function of the actual value of the armature current in the frequency domain, and $b_1$, $b_2$, $c_0$ and $c_1$ are the coefficients of the polynomial fraction.

Besides, the partial derivative of each of the coefficients of the polynomial fraction in the error function is made zero, the coefficients of the polynomial fraction can be derived from the following equations (25), (26), (27) and (28):

$$\frac{\partial E_I'}{\partial b_2} = 2 \sum_{s=s_1}^{s_2} ((s^3 + b_2 s^2 + b_1 s)I - (c_1 s + c_0))(s^2 I) = 0, \quad (25)$$

$$\frac{\partial E_I'}{\partial b_1} = 2 \sum_{s=s_1}^{s_2} ((s^3 + b_2 s^2 + b_1 s)I - (c_1 s + c_0))(sI) = 0, \quad (26)$$

$$\frac{\partial E_I'}{\partial c_1} = 2 \sum_{s=s_1}^{s_2} ((s^3 + b_2 s^2 + b_1 s)I - (c_1 s + c_0))(-s) = 0, \quad (27)$$

$$\frac{\partial E_I'}{\partial c_0} = 2 \sum_{s=s_1}^{s_2} ((s^3 + b_2 s^2 + b_1 s)I - (c_1 s + c_0))(-1) = 0. \quad (28)$$

In view of the foregoing, the above equations (25), (26), (27) and (28) can be rewritten as the following equation (29):

$$\begin{bmatrix} b_2 \\ b_1 \\ c_1 \\ c_0 \end{bmatrix} = \begin{bmatrix} \sum_{s=s_1}^{s_2} s^4 I^2 & \sum_{s=s_1}^{s_2} s^3 I^2 & -\sum_{s=s_1}^{s_2} s^2 I & -\sum_{s=s_1}^{s_2} s^2 I \\ \sum_{s=s_1}^{s_2} s^3 I^2 & \sum_{s=s_1}^{s_2} s^2 I^2 & -\sum_{s=s_1}^{s_2} s^2 I & -\sum_{s=s_1}^{s_2} sI \\ \sum_{s=s_1}^{s_2} s^3 I & \sum_{s=s_1}^{s_2} s^2 I & -\sum_{s=s_1}^{s_2} s^2 & -\sum_{s=s_1}^{s_2} s \\ \sum_{s=s_1}^{s_2} s^2 I & \sum_{s=s_1}^{s_2} sI & -\sum_{s=s_1}^{s_2} s & -\sum_{s=s_1}^{s_2} 1 \end{bmatrix}^{-1} \begin{bmatrix} -\sum_{s=s_1}^{s_2} s^5 I^2 \\ -\sum_{s=s_1}^{s_2} s^4 I^2 \\ -\sum_{s=s_1}^{s_2} s^4 I \\ -\sum_{s=s_1}^{s_2} s^3 I \end{bmatrix}. \quad (29)$$

$b_1$, $b_2$, $c_0$ and $c_1$ are the coefficients of the polynomial fraction in the equation (22).

Based on the equations (8) and (22), $b_1$, $b_2$, $c_0$ and $c_1$ are $$\frac{R_a B + K^2}{L_a J}, \frac{B}{J} + \frac{R_a}{L_a}, \frac{B\hat{v}}{L_a J} \text{ and } \frac{\hat{v}}{L_a},$$

respectively.

In addition, according to the above equations (9), a fourth frequency domain function of the estimated value of the filtered rotational speed can be rewritten as:

$$\hat{W}(s) = \frac{d_0}{s^3 + b_2 s^2 + b_1 s}. \tag{30}$$

$\hat{W}(s)$ is the estimated value of the rotational speed in the frequency domain after the noise is filtered, $b_1$, $b_2$ and $d_0$ are coefficients of the polynomial fraction, and S is the complex frequency.

For example, assume an actual value of the rotational speed in the frequency domain is W. In this case, an error function between the actual value W and an estimated value $\hat{W}$ can be expressed as:

$$E_W = \sum_{s=s_1}^{s_2} (W(s) - \hat{W}(s))^2. \tag{31}$$

$E_W$ is the difference between the actual value and the estimated value of the rotational speed, S is the complex frequency, $S_1$ is a lower limit of the complex frequency, and $S_2$ is an upper limit of the complex frequency. W(s) is the actual value of the rotational speed in the frequency domain. $\hat{W}(s)$ is the estimated value of the rotational speed in the frequency domain.

Based on the above, when the actual value of the armature current is equal to the estimated value of the armature current in the frequency domain (the difference between the actual value and the estimated value is 0), since both $$\left(\frac{(s^3 + b_2 s^2 + b_1 s)W(s) - d_0}{s^3 + b_2 s^2 + b_1 s}\right)^2$$

and $((s^3 + b_2 s^2 + b_1 s)W(s) - d_0)^2$ are zero and have the same solution, the equation (30) can be introduced into equation (31) to obtain equation (32) below:

$$E'_w = \sum_{s=s_1}^{s_2} ((s^3 + b_2 s^2 + b_1 s)W(s) - d_0)^2. \tag{32}$$

$E_w'$ is the difference between the actual value and the estimated value of the rotational speed in the frequency domain, S is the complex frequency, $S_1$ is a lower limit of the complex frequency, $S_2$ is an upper limit of the complex frequency, W(s) is the actual value of the rotational speed in the frequency domain, and $b_1$, $b_2$ and $d_0$ are coefficients of the polynomial fraction.

Based on equations (22) and (30), since the armature current and the rotational speed are the signals from the transient model, their characteristic roots would be the same.

Therefore, equations (30) and (22) have the same denominators whose efficiencies are already obtained from equation (29). As a result, the partial derivatives of the coefficients of the polynomial fraction in the error function are set as zero. The coefficients of the polynomial fraction are calculated as follows:

$$\frac{\partial E'_w}{\partial d_0} = 2 \sum_{s=s_1}^{s_2} ((s^3 + b_2 s^2 + b_1 s)W(s) - d_0)(-1) = 0. \tag{33}$$

The equation (33) can be derived as equation (34) below:

$$d_0 = \frac{1}{s_2 - s_1 + 1}\left(\sum_{s=s_1}^{s_2} W(s)(s^3 + b_2 s^2 + b_1)\right). \tag{34}$$

The coefficient $d_0$ can be derived from equations (9) and (30) as $$\frac{\hat{v} K}{L_a J}.$$

Based on the above, since the coefficients $c_0$ and $c_1$ of the polynomial fraction are $$\frac{B\hat{v}}{L_a J} \text{ and } \frac{\hat{v}}{L_a},$$

respectively, it can be derived that $L_a = \hat{v}/c_1$ and $$\frac{B}{J} = \frac{c_0}{c_1}.$$

In addition, the coefficients $b_1$ and $b_2$ of the polynomial fraction are $$\frac{R_a B + K^2}{L_a J} \text{ and } \frac{B}{J} + \frac{R_a}{L_a},$$

respectively. Therefore, it can be derived that $$K = \frac{b_1 \hat{v} - R_a c_0}{d_0} \text{ and } R_a = \frac{\hat{v}}{c_1}\left(b_2 - \frac{c_0}{c_1}\right).$$

Furthermore, since $d_0$ is $$\frac{\hat{v} K}{L_a J},$$

it can be derived that $$B = \frac{Kc_0}{d_0} \text{ and } J = \frac{Kc_1}{d_0}.$$

Based on the above, the parameters of the DC machine can be expressed as equations (35)-(39).

$$J = \frac{Kc_1}{d_0}, \quad (35)$$

$$R_a = \frac{\hat{v}}{c_1}\left(b_2 - \frac{c_0}{c_1}\right), \quad (36)$$

$$K = \frac{b_1\hat{v} - R_a c_0}{d_0}, \quad (37)$$

$$B = \frac{Kc_0}{d_0}, \quad (38)$$

$$L_a = \hat{v}/c_1. \quad (39)$$

The parameter outputting step S5 may output the estimated values of the parameters of the DC machine by the computer system. In this embodiment, the estimated values of the DC machine include the armature resistance $R_a$, the armature inductance $L_a$, the back electromotive force constant ($K_E$), the moment of inertia (J) and the friction coefficient (B).

Figure 3:
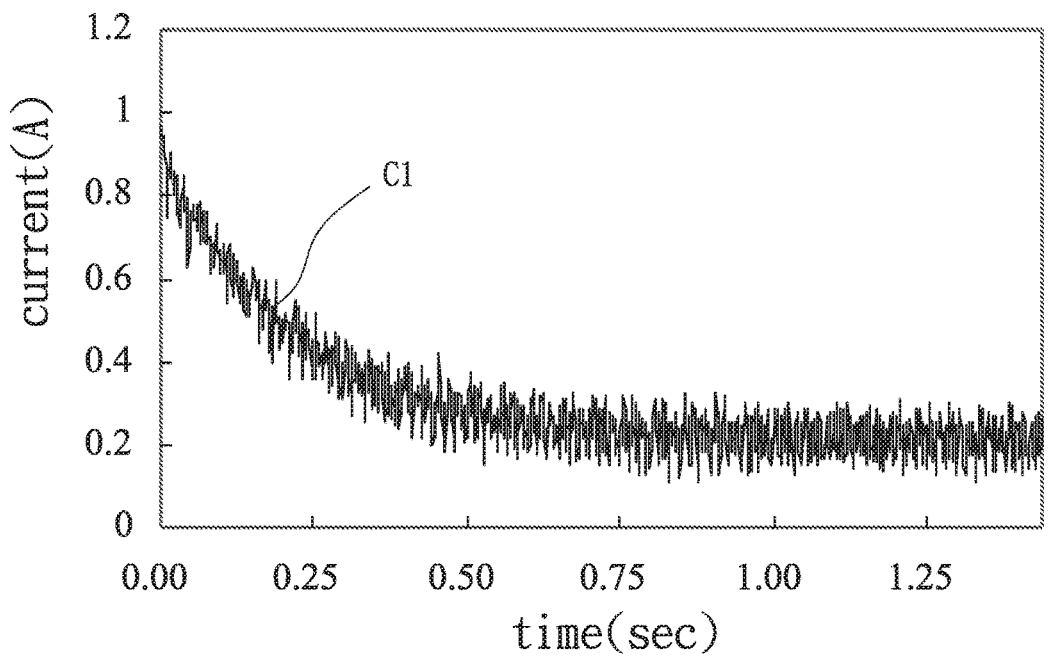
FIG. 3 shows a waveform diagram of an armature current of the DC machine containing noise

In order to verify the processing capability against the noise of the present invention, and to evaluate the accuracy and reliability under the practical applications, a DC machine (e.g., the one with the power of 150 W) is provided as an example to verify and evaluate the present invention. FIG. 3 is a waveform diagram of the armature current of the DC machine containing noise. The original set of discrete values of the armature current can be represented as armature current. In the invention, the armature current is transformed from time domain to frequency domain via the transforming step S2 and the noise filtering step S3 such that the high frequency noise does not appear in the low frequency region. In this situation, the armature current curve C1 decays in an exponential manner, completely filtering the noise in the armature current while assuring the transient characteristics thereof. In this manner, the invention has an advantage of improving the accuracy in estimating the parameter values of the DC machine.

The following Table 1 is the estimated results of the parameters of the DC machine.

TABLE 1

| Parameters | Values |
| --- | --- |
| $R_a$ (Ω) | 21.99 |
| $L_a$ (mH) | 4.81 |
| K | 0.124 |
| J (g·m$^2$) | 7.4 |
| B (g·m/rps) | 3.4 |

Figure 4:
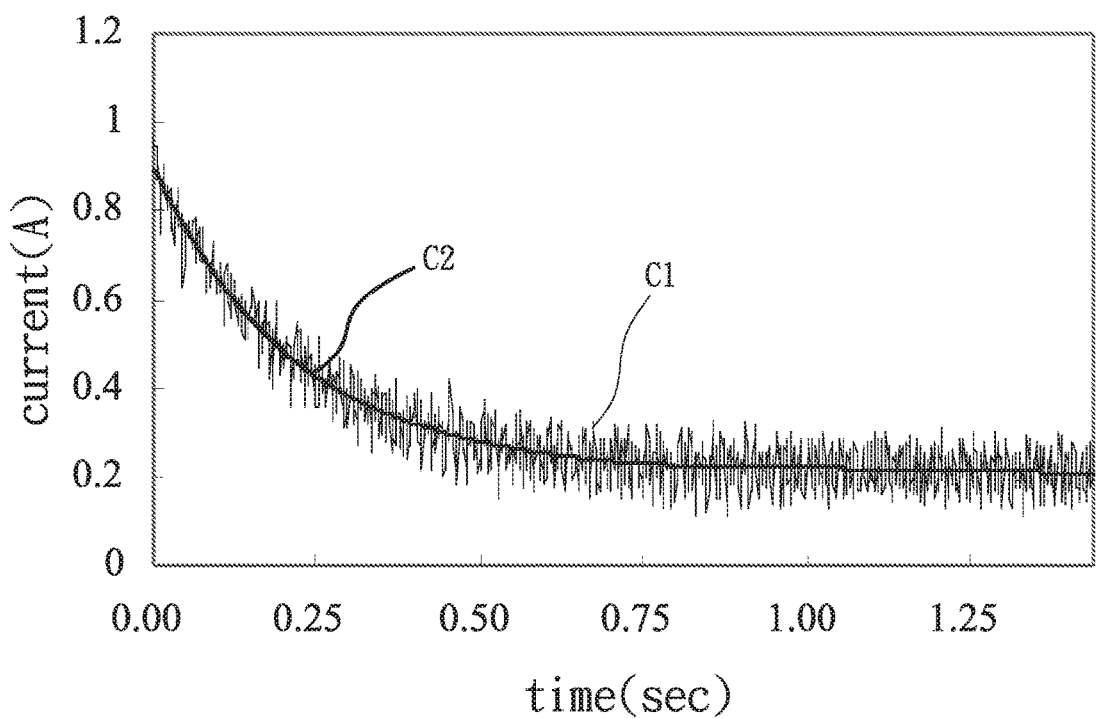
FIG. 4 shows a waveform diagram of an estimated value of the armature current of the DC machine and a waveform diagram of an actual value of the armature current of the DC machine.
Figure 5:
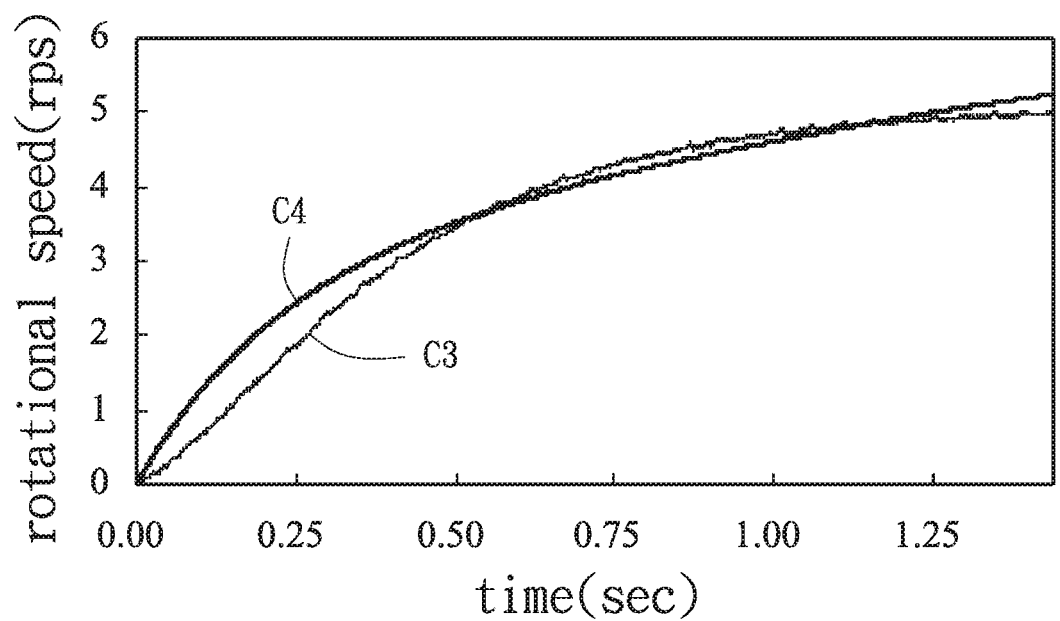
FIG. 5 shows a waveform diagram of an estimated value of a rotational speed of the DC machine and a waveform diagram of an actual value of the rotational speed of the DC machine.

FIGS. 4 and 5 show the armature current curve C1 and a rotational speed curve C3, respectively. The data in armature current curve C1 is introduced into equation (20) and the data in rotational speed curve C3 is introduced into equation (21) to obtain an armature resistance $R_a$ of 21.9902, an armature inductance $L_a$ of 4.81 mH, a back electromotive force constant or a torque constant (K) of 0.124, a moment of inertia J of 7.4 g·m$^2$ and a friction coefficient B of 3.4 (mN·m/sec/rad) based on equations (35) to (39), as shown in Table 1. Afterwards, the estimated results in Table 1 are used in a dynamic analysis of the computer system to respectively generate an estimated terminal voltage curve C2 (as shown in FIG. 4) and an estimated rotational speed curve C4 (as shown in FIG. 5). It can be observed from FIGS. 4 and 5 that the estimated terminal voltage curve C2 and the estimated rotational speed curve C4 match the armature current curve C1 and the rotational speed curve C3. Thus, the invention has an advantage of improving the reliability in estimating the parameter values of the DC machine.

In addition, by using a programming language (such as C++, Java, etc.), the method for estimating the parameters of the DC machine by the Laplace transform according to the above embodiment of the invention can be implemented as a computer program (such as a DC machine parameter estimation program for determining whether the estimated values of the DC machine parameter are consistent with the actual behavior of the DC machine). The coding method of the computer program can be understood by a person skilled in the art. The program code can be utilized to produce a program product with a built-in computer program. Based on this, when the computer system loads and executes the computer program, the method according to the above embodiment of the invention can be performed.

In summary, through expressing the discrete values of the terminal voltage, the armature current and the rotational speed by polynomial regression, the method for estimating the parameters of the DC machine by the Laplace transform according to an embodiment of the invention is able to maintain the transient characteristics of the DC machine during the filtering process of the noise. Moreover, the method according to the embodiment of the invention may transform the parameters of the DC machine from the time domain to the frequency domain, effectively reducing the operational complexity. Advantageously, the accuracy and operational efficiency in estimating the parameters of the DC machine can be improved.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method for estimating parameters of a direct current (DC) machine by Laplace transform as executed by a computer system dedicated to estimating the parameters of the direct current machine, wherein the computer system includes a calculation module, a human machine interface, a data retrieval module, a servo driver, a servo motor and the DC machine, with the method comprising:

establishing a transient model of the direct current machine by the calculation module, wherein the transient model includes an equivalent circuit and an equivalent mechanism, wherein the equivalent circuit includes an armature resistance, an armature inductance and a back electromotive force constant, and wherein the equivalent mechanism includes a moment of inertia and a friction coefficient;

sampling a terminal voltage, an armature current and a rotational speed of the direct current machine at a plurality of time points by the computer system, as performed by the data retrieval module;

quantizing each of the terminal voltage, the armature current and the rotational speed into a discrete value at each of the plurality of time points when the direct current machine is started, as performed by the data retrieval module;
generating an estimated value of each of the terminal voltage, the armature current and the rotational speed based on the discrete values of the terminal voltage, the armature current and the rotational speed, as performed by the data retrieval module;
establishing a transfer function based on the transient mode by the calculation module, wherein the transfer function generates a first frequency domain function of the estimated value of the armature current and a second frequency domain function of the estimated value of the rotational speed according to the Laplace transform;
expressing the first and second frequency domain functions to generate third and fourth frequency domain functions, respectively, as performed by the calculation module;
making the first and third frequency domain functions equal to each other and the second and fourth frequency domain functions equal to each other to generate relational equations of the armature resistance, the armature inductance, the back electromotive force constant, the moment of inertia, and the friction coefficient, as performed by the calculation module;
obtaining relational equations of the armature resistance, the armature inductance, the back electromotive force constant, the moment of inertia and the friction coefficient by setting the first and third frequency domain functions equal to each other and the second and fourth frequency domain functions equal to each other, as performed by the calculation module;
expressing a difference between an actual value of the armature current and the estimated value of the armature current by a first error function to generate coefficients of a polynomial fraction of the third frequency domain function, and a difference between an actual value of the armature current and the estimated value of the armature current by a second error function to generate coefficients of a polynomial fraction of the fourth frequency domain function, as performed by the calculation module;
generating coefficients of a polynomial fraction of the estimated value of the rotational speed according to a plurality of frequency domain values of the rotational speed and the first error function;
adjusting the relational equations according to the coefficients of the polynomial fractions of the third and fourth frequency domain functions; and
outputting the estimated values of the armature resistance and the armature inductance, the back electromotive force constant, a value of the moment of inertia and a value of the friction coefficient to the data retrieval module.

2. The method for estimating the parameters of the direct current machine by the Laplace transform as claimed in claim 1, wherein the transfer function is expressed as:

$$\begin{bmatrix} R_a + L_a P & K \\ K & -(B+JP) \end{bmatrix} \begin{bmatrix} \hat{i} \\ \hat{\omega} \end{bmatrix} = \begin{bmatrix} \hat{v} \\ 0 \end{bmatrix},$$

wherein $\hat{v}$, $\hat{i}$ and $\hat{\omega}$ are the terminal voltage, the armature current and the rotational speed, respectively, wherein $R_a$, $L_a$, J and B are the armature resistance, the armature inductance, the moment of inertia and the friction coefficient, respectively, wherein P is a notation for differentiation, and wherein K is the back electromotive force constant or a torque constant.

3. The method for estimating the parameters of the direct current machine by the Laplace transform as claimed in claim 2, wherein the first frequency domain function is expressed as:

$$\hat{I}(s) = \frac{\hat{v}\left(\frac{1}{L_a} + \frac{B}{L_a J}\right)}{s\left(s^2 + s\left(\frac{B}{J} + \frac{R_a}{L_a}\right) + \frac{R_a B + K^2}{L_a J}\right)},$$

wherein $\hat{I}(s)$ is the estimated value of the armature current, $\hat{v}$ is the estimated value of the terminal voltage, and s is a complex frequency.

4. The method for estimating the parameters of the direct current machine by the Laplace transform as claimed in claim 2, wherein the third frequency domain function is expressed as:

$$\hat{I}(s) = \frac{c_1 s + c_0}{s^3 + b_2 s^2 + b_1 s},$$

wherein $\hat{I}(s)$ is the estimated value of the armature current after noise is filtered, wherein $b_1$, $b_2$, $c_0$ and $c_1$ are the coefficients of the polynomial fraction of the third frequency domain function, and wherein S is a complex frequency.

5. The method for estimating the parameters of the direct current machine by the Laplace transform as claimed in claim 4, wherein the polynomial fraction of the armature current is expressed as:

$$E'_I = \sum_{s=s_1}^{s_2} ((s^3 + b_2 s^2 + b_1 s)I(s) - (c_1 s + c_0))^2,$$

wherein $E_I'$ is the difference between the actual value of the armature current and the estimated value of the armature current, wherein $s_1$ is a lower limit of the complex frequency, and wherein $s_2$ is an upper limit of the complex frequency.

6. The method for estimating the parameters of the direct current machine by the Laplace transform as claimed in claim 5, wherein a partial derivative of each of the coefficients of the polynomial fraction of the first error function is made zero to obtain the coefficients as:

$$\begin{bmatrix} b_2 \\ b_1 \\ c_1 \\ c_0 \end{bmatrix} = \begin{bmatrix} \sum_{s=s_1}^{s_2} s^4 I^2 & \sum_{s=s_1}^{s_2} s^3 I^2 & -\sum_{s=s_1}^{s_2} s^2 I & -\sum_{s=s_1}^{s_2} s^2 I \\ \sum_{s=s_1}^{s_2} s^3 I^2 & \sum_{s=s_1}^{s_2} s^2 I^2 & -\sum_{s=s_1}^{s_2} s I & -\sum_{s=s_1}^{s_2} s I \\ \sum_{s=s_1}^{s_2} s^3 I & \sum_{s=s_1}^{s_2} s^2 I & -\sum_{s=s_1}^{s_2} s^2 & -\sum_{s=s_1}^{s_2} s \\ \sum_{s=s_1}^{s_2} s^2 I & \sum_{s=s_1}^{s_2} s I & -\sum_{s=s_1}^{s_2} s & -\sum_{s=s_1}^{s_2} 1 \end{bmatrix}^{-1} \begin{bmatrix} -\sum_{s=s_1}^{s_2} s^5 I^2 \\ -\sum_{s=s_1}^{s_2} s^4 I^2 \\ -\sum_{s=s_1}^{s_2} s^4 I \\ -\sum_{s=s_1}^{s_2} s^3 I \end{bmatrix}.$$

7. The method for estimating the parameters of the direct current machine by the Laplace transform as claimed in claim 2, wherein the second error function is expressed as:

$$\hat{W}(s) = \frac{\frac{\hat{v}K}{L_a J}}{s\left(s^2 + s\left(\frac{B}{J} + \frac{R_a}{L_a}\right) + \frac{R_a B + K^2}{L_a J}\right)},$$

wherein $\hat{W}(s)$ is the estimated value of the rotational speed, $\hat{v}$ is the estimated value of the terminal voltage, and s is a complex frequency.

8. The method for estimating the parameters of the direct current machine by the Laplace transform as claimed in claim 7, wherein the fourth frequency domain function is expressed as:

$$\hat{W}(s) = \frac{d_0}{s^3 + b_2 s^2 + b_1 s},$$

wherein $\hat{W}(s)$ is the estimated value of the rotational speed after noise is filtered, and wherein $b_1$, $b_2$ and $d_0$ are the coefficients of the polynomial fraction of the fourth frequency domain function.

9. The method for estimating the parameters of the direct current machine by the Laplace transform as claimed in claim 8, wherein the second error function is expressed as:

$$E'_w = \sum_{s=s_1}^{s_2} ((s^3 + b_2 s^2 + b_1 s)W(s) - d_0)^2,$$

wherein $E_w'$ is the difference between the actual value of the rotational speed and the estimated value of the rotational speed, wherein $s_1$ is a lower limit of the complex frequency, and wherein $s_2$ is an upper limit of the complex frequency.

10. The method for estimating the parameters of the direct current machine by the Laplace transform as claimed in claim 9, wherein a partial derivative of each of the coefficients of the polynomial fraction of the second error function is made zero to obtain the coefficients as:

$$d_0 = \frac{1}{s_2 - s_1 + 1}\left(\sum_{s=s_1}^{s_2} W(s)(s^3 + b_2 s^2 + b_1)\right).$$

11. An apparatus for estimating parameters of a direct current machine by Laplace transform, comprising a computer system dedicated to performing the method for estimating the parameters of the direct current machine by the Laplace transform as claimed in claim 1.

* * * * *